United States Patent [19]

Srivastava

[11] 4,207,588
[45] Jun. 10, 1980

[54] COLOR KILLER

[75] Inventor: Gopal Srivastava, Mt. Prospect, Ill.

[73] Assignee: Zenith Radio Corporation, Glenview, Ill.

[21] Appl. No.: 2,522

[22] Filed: Jan. 11, 1979

[51] Int. Cl.² ............................................. H04N 9/49
[52] U.S. Cl. ................................................. 358/26
[58] Field of Search .............................. 358/26, 27, 21

Primary Examiner—John C. Martin

[57] ABSTRACT

A hysteresis type color killer is described for use in a color television receiver. Lower power dissipation in the color killer is achieved by adapting an existing transistor stage in the chroma channel as a source of d.c. feedback for the color killer. Hence, the transistor stage does double duty and power dissipation is lowered.

7 Claims, 1 Drawing Figure

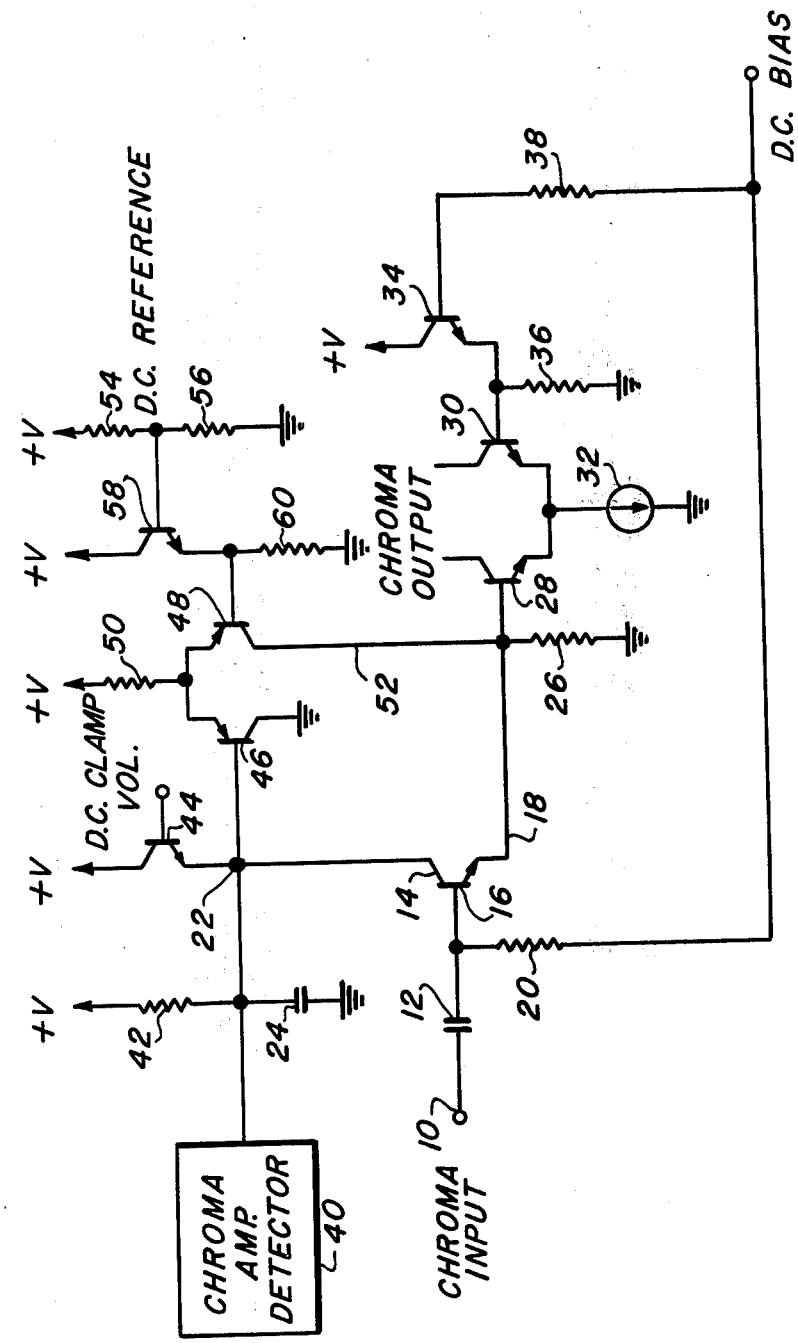

COLOR KILLER

BACKGROUND OF THE INVENTION

This invention is generally directed to color television receivers and particularly to so-called "color killers" in such receivers.

Conventionally, color television receivers include one or more chroma amplifiers for amplifying the chroma signal. The gain of at least one of those amplifiers is usually controlled by a burst amplitude detector. The latter device develops a d.c. voltage indicative of the size of the burst signal which forms a part of the composite television signal. On the assumption that the magnitude of the burst signal and the magnitude of the chroma signal vary together, a d.c. voltage indicative of a low level burst signal also indicates a low level chroma signal. Hence, the d.c. voltage generated by the burst detector is conventionally used to vary the gain of a chroma amplifier.

When a burst is not present on the received television signal, that is an indication that a chroma signal is also not being transmitted. Hence, color television receivers also incorporate a "color killer" to close the chroma channel, such as by turning off one of the chroma amplifiers. The latter operation inhibits noise from the chroma channel from reaching the picture tube.

A problem which arises in connection with the color killer is that it is frequently unable to distinguish between the absence of a burst signal and the presence of a very low level of burst signal. Hence, if a low level burst signal varies above and below the turn-off point of the color killer, the chroma channel will be turned off and on also, thus generating an undesirable chroma flicker. To avoid such flicker, it has been proposed that the color killer include hysteresis whereby the color channel is turned off at a first low burst level and then turned on again at a second higher burst level. Thus, if variations in the level of the burst are smaller than the difference between the first and second levels, color flicker does not occur.

The use of a hysteresis-type color killer for turning off and on a chroma amplifier presents some difficulties when the color killer and the chroma amplifier are constructed as integrated circuits, as they frequently are in modern receivers. Particularly troublesome is the additional current required and the attendant undesirable increase in power dissipation which occurs when additional circuitry is included to provide the color killer with the hysteresis effect. Hence, the desirable hysteresis effect has either not been included in receivers constructed of integrated circuits, or included only with the drawback of undesirably high power dissipation.

OBJECTS OF THE INVENTION

It is a general object of the invention to provide an improved color killer adaptable for construction in integrated circuit form.

It is a more specific object of the invention to provide a color killer having a hysteresis effect and adapted for construction in integrated circuit form without substantially increasing power dissipation in the integrated circuit.

It is another object of the invention to provide a combined chroma amplifier and color killer which includes hysteresis without substantially increasing power dissipation.

BRIEF DESCRIPTION OF THE FIGURES

The above mentioned and other objects of the invention are more particularly set forth in the following detailed description and in the accompanying drawing which depicts a preferred embodiment of a combined chroma amplifier and color killer according to the invention.

SUMMARY OF THE INVENTION

The invention provides a hysteresis type color killer having reduced power dissipation for use in a color television receiver. Conventionally, the receiver includes circuitry for developing a chroma amplitude signal whose level varies with the level of a received chroma signal, and a chroma channel for coupling the chroma signal therethrough.

According to the invention, a first transistor means which is associated with the chroma channel for coupling the chroma signal therethrough is adapted to have a d.c. conduction level variable between first and second states. In the first state, the first transistor means couples the chroma signal through the chroma channel, and in the second state the first transistor means closes the chroma channel.

Means receiving the chroma amplitude signal and sensing the conduction level of the first transistor means develops a control signal whose level is a function of the level of the chroma amplitude signal and the level of the conduction of the first transistor means. To change the state of the first transistor means, a second transistor means in a color killer circuit receives the control signal and is coupled in a feedback arrangement with the first transistor means. The second transistor means responds to first and second predetermined levels of the control signal for varying the conduction level of the first transistor means such that the latter is quickly switched between its two states for closing and opening the chroma channel.

Hysteresis in the feedback loop occurs as a result of the change in the level of the control signal in response to changes in the level of conduction of the first transistor means. Moreover, power dissipation is reduced by utilizing the first transistor means both in the chroma channel and in the feedback loop of the color killer.

DESCRIPTION OF THE PREFERRED EMBODIMENT

Referring now to the FIGURE, there is shown an embodiment of the invention in which a color killer circuit and a chroma amplifier cooperate to turn the chroma channel off and on with a hysteresis type action. The chroma channel illustrated includes a chroma input terminal 10 which receives the chroma signal from any convenient source in the receiver. For example, the signal at the terminal 10 may be from a prior stage of chroma amplification.

The signal at the terminal 10 is coupled through a capacitor 12 to a first transistor means which is part of the chroma channel and which has a first state for opening the chroma channel and a second state for closing the chroma channel. In this illustrated embodiment, the first transistor means comprises a transistor whose base terminal 16 receives the chroma channel. When the transistor 14 is in its first or "on" state, a quiescent current flows in the transistor 14 so that the received chroma signal is coupled to its emitter terminal 18. The quiescent current in the transistor 14 is established by a resistor 20 coupled between the base terminal 16 and a d.c. bias, as shown.

The collector terminal of the transistor 14 is coupled to a node 22 as part of a d.c. feedback loop which is described in more detail thereinafter. To remove chroma signal from the node 22, a filter capacitor 24 is coupled between ground and the node 22.

The A.C. and D.C. current flowing in the transistor 14 are provided with a path to ground through a resistor 26. Hence, the voltage at the emitter terminal 18 is a function of the current through the resistor 26. As will be described, that current is modified by color killer circuitry for turning off the transistor 14 when no chroma signal is received.

The chroma signal present at the emitter terminal 18 may be amplified as by a conventional differential amplifier comprising transistors 28 and 30 and a current source 32. The amplified chroma signal may be taken from one or both of the collectors of the transistors 28 and 30 for further amplification by a video output amplifier.

To provide operating bias for the transistor 30, a further transistor 34 is included as shown with a resistor 36 coupled between ground and the emitter terminal of the transistor 34. Bias for the transistor 34 is provided by a resistor 38 coupled between the d.c. bias source and the base terminal of the transistor 34.

With the illustrated arrangement, the chroma signal at the input terminal 10 is amplified at the collector terminals of the transistors 28 and 30 when the transistor 14 is on; when the transistor 14 is off, the chroma channel is closed and no chroma appears at the collectors of the transistors 28 and 30.

A color killer circuit which cooperates with the transistor 14 for turning the chroma channel off and on will now be described.

As is conventional in color television receivers, there is a chroma amplitude detector 40 which generates a d.c. signal representative of the amplitude of a received chroma signal. For example, the detector 40 may be a conventional burst detector which develops a d.c. signal representative of the amplitude of the chroma burst. Irrespective of the form which the detector 40 takes, its output is referred to herein as a "chroma amplitude signal". That signal appears at the node 22 along with another d.c. signal whose value is a function of the level of current in the transistor 14. The combination of those d.c. signals may be described as a control signal which appears at the node 22 for controlling the opening and closing of the chroma channel.

The control signal is developed in this embodiment by converting the collector current of the transistor 14 to a voltage which is summed with the output of the chroma amplitude detector 40. That summation is effected by coupling a resistor 42 between the node 22 and a source of positive voltage +V, the latter of which is selected to properly bias the collector-base junction of the transistor 14. Hence, the collector current of the transistor 14 flows from the source +V, through the resistor 42 to the node 22, and thence to the transistor 14. Any changes in the level of current conducted by the transistor 14 will thus be reflected in a corresponding voltage change in the control signal at the node 22.

To insure that the collector voltage of the transistor 14 does not drop too low, the voltage at the node 22 is clamped to a minimum voltage by a transistor 44. As shown, the emitter terminal of the transistor is coupled to the node 44, its collector terminal is connected to the voltage source +V, and its base terminal is coupled to a d.c. clamp voltage. Thus, the minimum value of the control signal is determined by the d.c. clamp voltage less the base-emitter drop of the transistor 44.

To alter the current in the transistor 14 in response to changes in the level of the control signal, a transistor means in the form of an emitter-coupled pair of PNP transistors 46 and 48 are included. In general, the transistors 46 and 48 form part of a color killer circuit and are coupled in a feed back arrangement with the transistor 14 to diminish the current in the latter transistor when the control signal reaches a first predetermined level indicative of no or very little chroma signal. The feedback arrangement results in additional change in the level of the control signal such that the transistors 46 and 48 operate to further diminish the current in the transistor 14. The cycle continues until the transistor 14 is turned off and the chroma channel is closed.

Likewise, when the control signal indicates the presence of a chroma signal, the transistors 46 and 48 operate to turn the transistor 14 on. The resulting change in the collector current of the transistor 14 changes the level of the control signal further so that the transistors 46 and 48 operate to further increase the current in the transistor 14. This cycle continues until the transistor 14 is fully on and the chroma channel is open.

As will be evident from the discussion below, the chroma channel is turned off when the control signal reaches a first predetermined level and is turned on when the control signal reaches a second predetermined level. The difference between the first and second predetermined levels is the degree of hysteresis associated with the feedback loop.

In the illustrated embodiment, the base terminal of the transistor 46 is coupled to the node 22 for receiving the control signal. The emitter terminal of the transistor 46 is coupled to the emitter terminal of the transistor 48, and both are coupled through a common emitter resistor 50 to the source +V. As shown, the collector terminal of the transistor 46 may be grounded.

The collector terminal of the transistor 48 is coupled by a lead 52 to the junction of the resistor 26 and the emitter terminal of the transistor 14. Thus, the voltage at the emitter terminal 18 is a function of the current in the lead 52 and the emitter current of the transistor 14.

The point at which the transistors 46 and 48 conduct is established by a d.c. reference voltage derived by a pair of resistors 54 and 56 coupled between ground and the source +V. The reference voltage at the junction of the resistors 54 and 56 is applied to the base of a transistor 58. The emitter of the transistor 58 is coupled to the base of the transistor 48 and to ground through a resistor 60.

The illustrated color killer circuit is designed to operate properly when the level of the chroma amplitude signal from the detector 40 varies inversely with the level of the chroma signal; i.e., as the level of the chroma signal increases, the level of the chroma amplitude signal decreases, and vice versa. In addition, the value of the d.c. reference voltage is selected such that the transistor 46 is on and the transistor 48 is off when the control signal indicates that a chroma signal of useful amplitude is received. Otherwise, the transistor 48 is on and the transistor 46 is off. The transistors 46 and 48 are both on only during a short transition period when they are changing states, i.e., going from off to on.

In the case where a chroma signal of a useful amplitude is received the d.c. reference voltage is greater than the level of the control signal, thus causing the transistor 48 to be reverse biased (off) and the transistor 46 to be forward biased (on). In that case, no collector current from the transistor 48 flows through the resistor 26 and the operating point of the transistor 14 is determined essentially by the d.c. bias voltage at its base. Hence, the transistor 14 is on and the chroma signal is open.

When the amplitude of the chroma signal drops below a useful level or disappears completely, the chroma amplitude signal from the detector 40 increases, thereby increasing the control signal at the node 22 so as to begin turning the transistor 46 off. Because the combined current of the transistors 46 and 48 remains substantially constant, the transistor 48 begins turning on. The resulting current from the collector of the transistor 48 causes the voltage at the emitter terminal of the transistor 14 to increase. Consequently, the collector current of the transistor 14 decreases and the level of the control signal increases further. The transistor 48 then turns on harder, the transistor 14 conducts less, and the cycle continues until the transistor 14 is fully off. The chroma channel is then closed.

It will be appreciated that the level of the control signal increases by "X" volts when the transistor 14 turns off, "X" being equal to the quiescent current of the transistor 14 times the value of the impedance at the node 22. To turn the transistor 14 back on, the level of the chroma amplitude signal must decrease by "X" volts. Hence, the value of the hysteresis in the feedback loop is determined by "X" volts.

When the level of the chroma signal increases so that the level of the chroma amplitude signal decreases by "X" volts, the transistor 46 begins turning on, the transistor 48 begins turning off, and the voltage at the emitter of the transistor 14 decreases. Thus, the transistor 14 becomes forward biased and conducts. Consequently, the level of the control signal decreases further and the cycle continues until the transistor 48 is off and the transistor 14 is on. The chroma channel is then open.

From the description above, it is apparent that the transistor 14 serves a dual function. In the chroma channel, it is a part of a chroma amplifier comprising the transistors 14, 28, 30 and 34. It serves to couple the chroma signal to the transistors 28 and 30 and to provide bias for the transistor 28 in the same manner that the transistor 34 provides bias for the transistor 30.

As a part of the color killer, the transistor 14 is in a d.c. feedback loop for turning the chroma channel off and on with hysteresis type action. Consequently, no additional transistor is required in the feedback loop to serve that purpose. Such elimination of an additional transistor and its attendant power dissipation is particularly advantageous when the chroma channel and the color killer are fabricated on an integrated circuit chip. Hence, the advantages of a hysteresis type color killer are provided while the undesirable power dissipation usually associated therewith is greatly reduced.

While the invention has been described in terms of a preferred circuit arrangement, it will be obvious to those skilled in the art in light of this disclosure that many alterations and modifications to the preferred structure may be made without departing from the invention. Accordingly, it is intended that all such modifications and alterations be included within the spirit and scope of the invention as defined by the appended claims.

What is claimed is:

1. In a color television receiver having means for developing a chroma amplitude signal whose level varies with the level of a received chroma signal, and having a chroma channel for coupling the chroma signal therethrough, the improvement comprising:

first transistor means associated with the chroma channel for coupling the chroma signal therethrough, said first transistor means having a conduction level variable between a first state for coupling the chroma signal through the chroma channel and a second state for closing the chroma channel;

means receiving the chroma amplitude signal and sensing the conduction level of said first transistor means for developing a control signal whose level is a function of the level of the chroma amplitude signal and the level of conduction of said first transistor means;

second transistor means associated with a color killer circuit, coupled in a feedback arrangement with said first transistor means, and responsive to the control signal being of first and second predetermined levels for varying the conduction level of said first transister means such that the latter is quickly switched between its second and first states, respectively, for closing and opening the chroma channel, whereby hysteresis in the feedback loop occurs as a result of the change in the level of the control signal in response to changes in the level of conduction of said first transistor means, and power dissipation is reduced by utilizing said first transistor means both in the chroma channel and in the feedback loop of the color killer.

2. The improvement as set forth in claim 1 wherein said first transistor means has a given current level when in its first state, and wherein said second transistor means is responsive to the first predetermined level of the control signal for diminishing the current of said first transistor means so that the level of the control signal is thereby so changed that said second transistor means further diminishes the current of said first transistor means until the latter reaches its second state, and wherein said second transistor means is responsive to the second predetermined level of the control signal for increasing the current of said first transistor means so that the level of the control signal is thereby so changed that said second transistor means further increases the current of said first transistor means until the latter reaches its first state.

3. The improvement as set forth in claim 1 wherein said first transistor means has an input receiving the chroma signal for coupling of the chroma signal to an output thereof, whereby the chroma channel is closed when the current of said second transistor means is turned off by said second transistor means.

4. The improvement as set forth in claim 1 wherein said second transistor means includes a transistor responsive to the control signal reaching said first predetermined level for developing a control current, and said first transistor is disposed in the feedback arrangement with said second transistor means such that an increase in said control current causes the current of said first transistor means to diminish until said first transistor means reaches its second state.

5. The improvement as set forth in claim 4 wherein said combining means includes an impedance for changing the level of the control signal in accordance with changes in the level of current in said first transistor means, said impedance being coupled to first and second transistor means.

6. The improvement as set forth in claim 5 wherein said second transistor means includes a pair of emitter coupled transistors, a first of which has a base terminal receiving the control signal, and the second of which has a base terminal receiving a reference voltage and a collector terminal coupling the control current to said first transistor means, whereby when the level of the control signal substantially reaches the level of the reference voltage, the second transistor develops the control current for turning off the chroma channel.

7. In a color television receiver having means for developing a chroma amplitude signal whose level varies with the level of a received chroma signal, and having a chroma channel for coupling the chroma signal therethrough, the improvement comprising:

transistor means forming part of a chroma amplifier in the chroma channel and having a base terminal receiving the chroma signal, an emitter terminal and a collector terminal, and adapted to couple the chroma signal to the emitter terminal when a current is established in said first transistor means;

means coupled to the collector terminal of said first transistor means and receiving the chroma amplitude signal for developing a control signal whose level is a function of the level of the chroma amplitude signal and the current of said first transistor means; and a pair of emitter coupled transistors, a first of which has a base terminal receiving the control signal, and a second of which has a base terminal receiving a reference voltage and a collector terminal coupled to the emitter terminal of said first transistor means so as to diminish the current in said first transistor means when said second transistor conducts, said reference voltage being selected such that the first transistor is on and the second transistor is off when the control signal is indicative of a chroma signal being received and the first transistor is off and the second transistor is on when no chroma signal is received, whereby the absence of a chroma signal results in increasing conduction of the second transistor and decreasing conduction of said first transistor means until the latter and the chroma channel are turned off, and the receipt of a chroma signal results in decreasing conduction of said second transistor and increasing conduction of said first transistor means until the latter is fully on.

* * * * *